(12) United States Patent
Wentzloff et al.

(10) Patent No.: US 10,541,843 B2
(45) Date of Patent: Jan. 21, 2020

(54) LOW-POWER RECEIVER FOR FSK BACK-CHANNEL EMBEDDED IN 5.8GHZ WI-FI OFDM PACKETS

(71) Applicant: The Regents of The University of Michigan, Ann Arbor, MI (US)

(72) Inventors: David D. Wentzloff, Ann Arbor, MI (US); Hun-Seok Kim, Ann Arbor, MI (US); Jaeho Im, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/919,510

(22) Filed: Mar. 13, 2018

(65) Prior Publication Data

US 2019/0288887 A1 Sep. 19, 2019

(51) Int. Cl.
*H04L 27/152* (2006.01)
*H04B 1/00* (2006.01)
*H04B 1/403* (2015.01)
*H04L 5/00* (2006.01)

(52) U.S. Cl.
CPC ....... *H04L 27/1525* (2013.01); *H04B 1/0078* (2013.01); *H04B 1/406* (2013.01); *H04L 5/0007* (2013.01)

(58) Field of Classification Search
CPC ............ H04L 27/1525; H04L 27/0005; H04B 1/0078; H04B 1/406
See application file for complete search history.

(56) References Cited

U.S. PATENT DOCUMENTS

| 9,419,838 | B1 | 8/2016 | Wentzloff et al. | |
| 2004/0207464 | A1* | 10/2004 | Petrovic | H03D 3/007 329/315 |
| 2005/0075077 | A1* | 4/2005 | Mach | H04B 1/1027 455/67.13 |
| 2007/0111697 | A1* | 5/2007 | Bellantoni | H03D 1/2245 455/324 |
| 2012/0274367 | A1* | 11/2012 | Yeo | H03D 7/163 327/113 |
| 2017/0093354 | A1* | 3/2017 | Tanaka | H03G 3/3068 |

* cited by examiner

*Primary Examiner* — Syed Haider
(74) *Attorney, Agent, or Firm* — Harness, Dickey & Pierce, P.L.C.

(57) ABSTRACT

An ultra-low power back-channel receiver is presented that demodulates binary a FSK back-channel signal embedded in 5.8 GHz IEEE 802.11a Wi-Fi OFDM packets. The architecture of the back-channel receiver employs a two-step down-conversion where the first mixing stage downconverts using the third harmonic of the local oscillator for power efficiency. The LP-65 nm CMOS receiver consumes 335 μW with a sensitivity of −72 dBm at a BER of $10^{-3}$ and data-rate of 31.25 kb/s. The radio uses a balun and a 250 kHz reference crystal as external components. The receiver uses a 1V supply voltage for analog blocks, and 0.85V for digital blocks including the local oscillator and the frequency-locked loop circuits.

18 Claims, 10 Drawing Sheets

LOW-POWER RECEIVER FOR FSK BACK-CHANNEL EMBEDDED IN 5.8GHZ WI-FI OFDM PACKETS

GOVERNMENT CLAUSE

This invention was made with government support under Grant No. ECCS-1507192 awarded by the National Science Foundation. The Government has certain rights in this invention.

FIELD

The present disclosure relates to low-power receiver that demodulates a back channel signal embedded in Wi-Fi data packets.

BACKGROUND

Wi-Fi is the most ubiquitous wireless networking protocol, but the excessive power consumption of Wi-Fi radios has limited their adoption into the rapidly growing class of ultra-low power (ULP) IoT devices. This is because the Wi-Fi requirements are not suitable for ULP implementations, and to date no <10 mW Wi-Fi receiver has been reported. Ideally an ULP IoT device would have an active network connection, however with Wi-Fi this results in continuously turning on the radio to keep the device associated with a router, limiting power savings from duty-cycling. ULP wake up radios could be used to address this problem, but these require custom signals not supported by Wi-Fi networks, limiting their widespread adoption. To close this gap, a messaging technique is developed as a back-channel that uses a Wi-Fi standard-compliant transmitter to produce a signal that can be detected by an ULP FSK receiver.

This disclosure presents a complete 335 µW ULP receiver able to demodulate FSK back-channel messages that are embedded in standard-compliant Wi-Fi packets. On the Wi-Fi router, generating back-channel messages only requires control of the payload data in a single packet, therefore it is supported by any 802.11a or later router and suitable for widespread adoption. By modulating the payload of a Wi-Fi packet, a wideband, binary FSK-modulated back-channel message is produced via the OFDM symbols. The ULP receiver then detects the FSK modulated back-channel message. This wideband FSK message relaxes several specifications of the ULP receiver such as phase distortion, order of the filter, and inter-modulation, which helps to reduce receiver power. The receiver down-converts the RF signal with the $3^{rd}$ harmonic term of commutating mixer. This reduces power consumption of the local oscillator (LO), enabling a wide band 5.8 GHz receiver at sub-mW.

This section provides background information related to the present disclosure which is not necessarily prior art.

SUMMARY

This section provides a general summary of the disclosure, and is not a comprehensive disclosure of its full scope or all of its features.

A low power RF receiver is presented. The RF receiver is comprised of an analog front-end circuit, an intermediate frequency stage circuit and a baseband frequency stage circuit. The analog front-end circuit is configured to receive an RF input signal and mixes the RF input signal with a front-end mixing signal to yield a down converted signal, where the front-end mixing signal has a frequency set at third harmonic of a difference between frequency of the RF input signal and a target frequency for the down converted signal. The intermediate frequency stage circuit is configured to receive the down converted signal from the analog front-end circuit and routes the down converted signal into each of two circuit detection paths, where each circuit detection path further down converts the down converted signal into a baseband signal and thereby forms a pair of baseband signals. The baseband frequency stage circuit is configured to receive the pair of baseband signals from the intermediate frequency stage circuit and demodulate bits encoded on the baseband signals, where the bits are encoded on the baseband signals using frequency-shift keying.

In another aspect, the pair of baseband signals are shifted so that one of the two signals has a frequency at or near zero. More specifically, the intermediate frequency stage circuit is configured to receive the down converted signal from the analog front-end circuit and route the down converted signal into two circuit detection paths. Each circuit detection path further down converts the down converted signal into a baseband signal and thereby forms a pair of baseband signals. The first circuit detection path has a first mixer in series with a first low pass filter, wherein first mixer mixes the down converted signal with a first mixing signal to yield a first mixed signal and the first mixing signal has a frequency substantially equal to a mark frequency of the binary frequency-shift keying method. The second circuit detection path has a second mixer in series with a second low pass filter, wherein second mixer mixes the down converted signal with a second mixing signal to yield a second mixed signal and the second mixing signal has a frequency substantially equal to a space frequency of the binary frequency-shift keying method. Of note, the cutoff of the first low pass filter and cutoff of the second low pass filter are set in between zero and the space frequency of the binary frequency-shift keying method.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
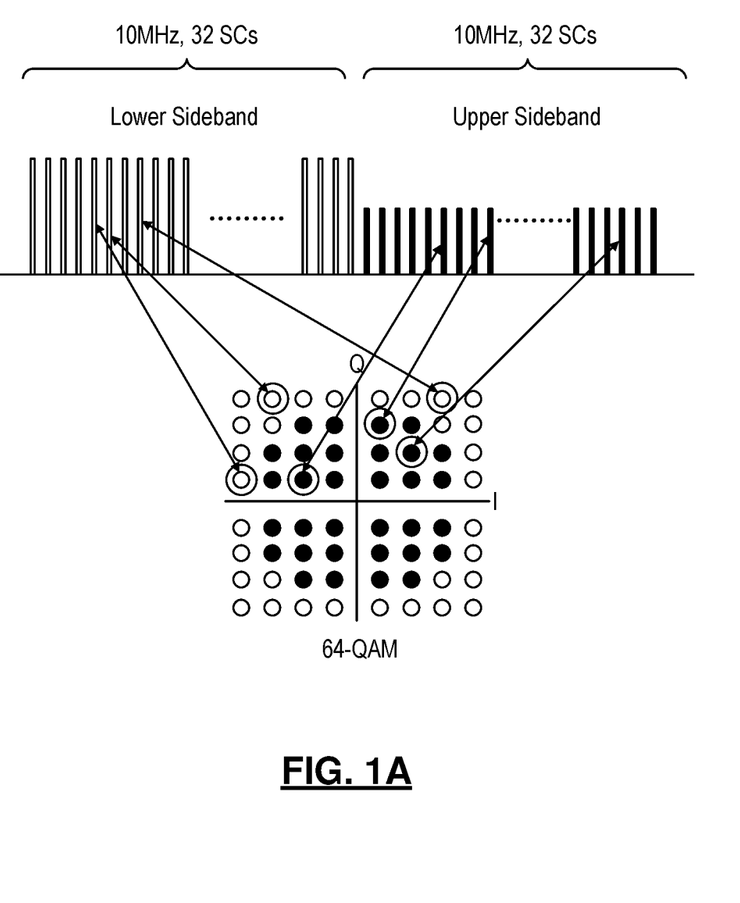
FIG. 1A is a diagram depicting the mapping of constellation points for a back-channel FSK signal.
Figure 1B:
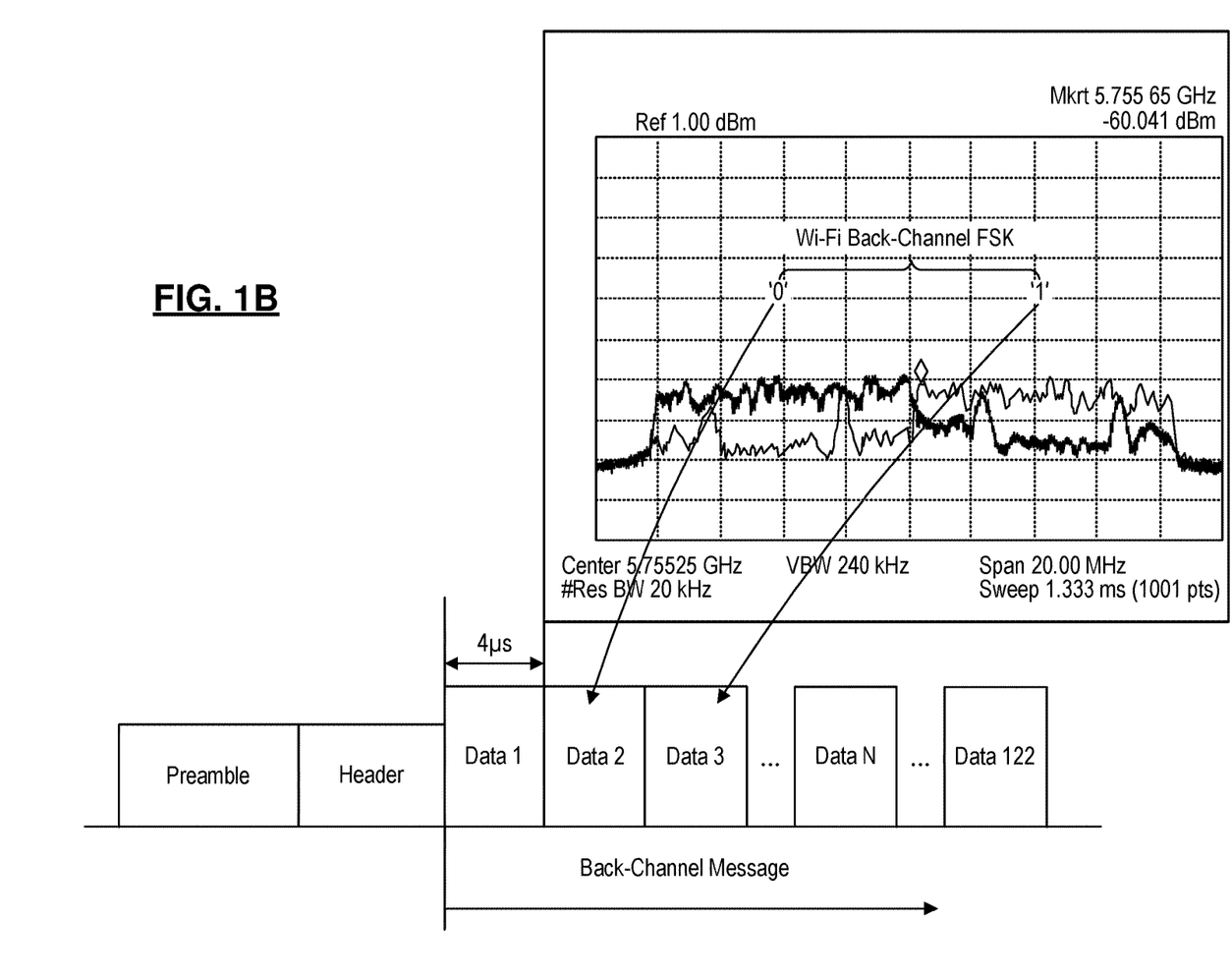
FIG. 1B is a diagram illustrating a Wi-Fi back channel FSK signal in relation to a corresponding packet structure.

Since 802.11a in 1999, Wi-Fi standards have used OFDM because it has numerous advantages for high throughput devices. The power consumption of wideband OFDM mod/demod, however, is not suitable for ULP radios because it requires a linear RF front-end, high-speed ADC/DAC, and significant baseband processing. OFDM transmitters are basically capable of generating a wide range of RF signals, by taking a time-domain signals' FFT and mapping that to each of the OFDM sub-carriers. By feeding carefully crafted bit sequences into the payload of a Wi-Fi packet, the Wi-Fi OFDM transmitter is made to produce a wideband back-channel FSK signal embedded in a 5.8 GHz IEEE 802.11a compliant OFDM packet. The frequency-shift keying (FSK) modulated back-channel occupies the same 20 MHz bandwidth, and each binary back-channel message bit is conveyed by one OFDM symbol (4 µs long). This is achieved by mapping only low-power constellation points to the lower half of the channel, and high-power points to the upper half to encode a '0' (and vice versa for a '1') as shown in FIG. 1B. Thus, the back-channel bit is demodulated by comparing the energy in the upper and lower halves of the Wi-Fi channel. While reference is made throughout this application to an FSK method, it is readily understood that the broader aspect of this disclosure are applicable to other types of modulation schemes.

In one embodiment, the max back-channel bit rate is identical to the Wi-Fi OFDM symbol rate, which is 250 kHz (i.e., 4 µs per back-channel bit). One can consider this as a spread spectrum scheme where 250 kb/s binary FSK is spread over a 20 MHz bandwidth. This simple non-coherent demodulation mechanism combined with a relatively low symbol rate allows an ULP implementation of a Wi-Fi back-channel receiver, as a companion wakeup radio to a fully compliant Wi-Fi radio. The wide bandwidth of the FSK back-channel symbols also makes the receiver relatively insensitive to phase noise and frequency offset in the LO, further reducing power.

Figure 2:
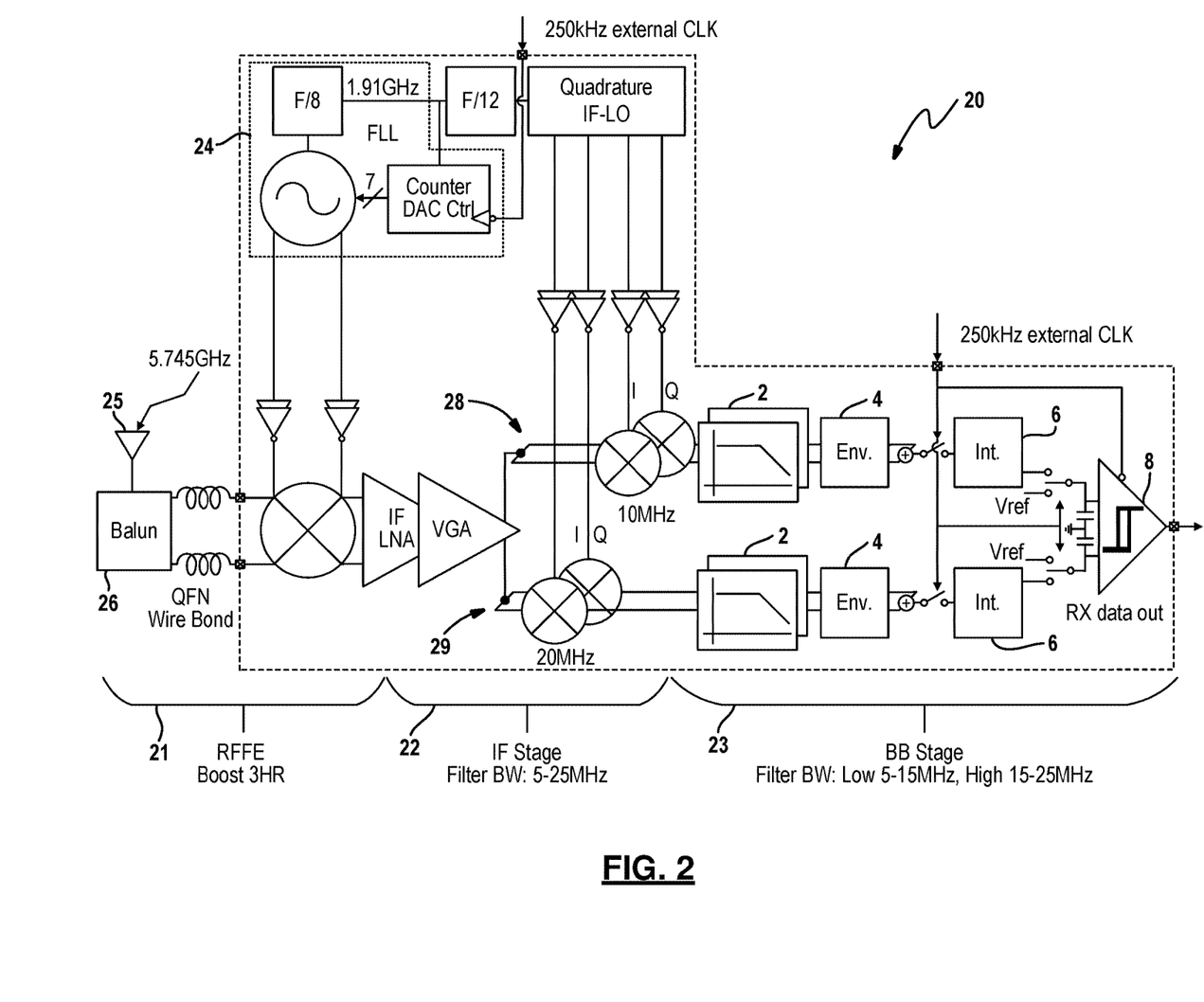
FIG. 2 is a schematic for an example embodiment of a low power RF receiver.

FIG. 2 depicts an example embodiment of a low power RF receiver 20. The RF receiver 20 is comprised generally of an analog front-end circuit 21, an intermediate frequency stage circuit 22, a baseband frequency stage circuit 23, and a clock circuit 24. In one embodiment, each of these circuits form an integrated circuit. In other embodiments, one or more of these components may be moved off chip. It is to be understood that the most relevant components are discussed in relation to FIG. 2, but that other components may be needed to control and manage the overall operation of the RF receiver.

An off-chip antenna 25 is configured to receive an RF input signal. The analog front-end circuit 21 receives the RF input signal from the antenna 25 and operates to mix the RF input signal with a front-end mixing signal to yield a down converted signal. Of note, the front-end mixing signal has a frequency set at third harmonic of a difference between frequency of the RF input signal and a target frequency for the down converted signal as further described below. In the example embodiment, the RF input signal has a center frequency of 5.745 GHz and the target frequency for the down converted signal is 5-25 MHz. In this case, the front-end mixing signal has a frequency set at third harmonic of 1.91 GHz. Specific frequency values are intended to be illustrative and non-limiting.

Figure 3:
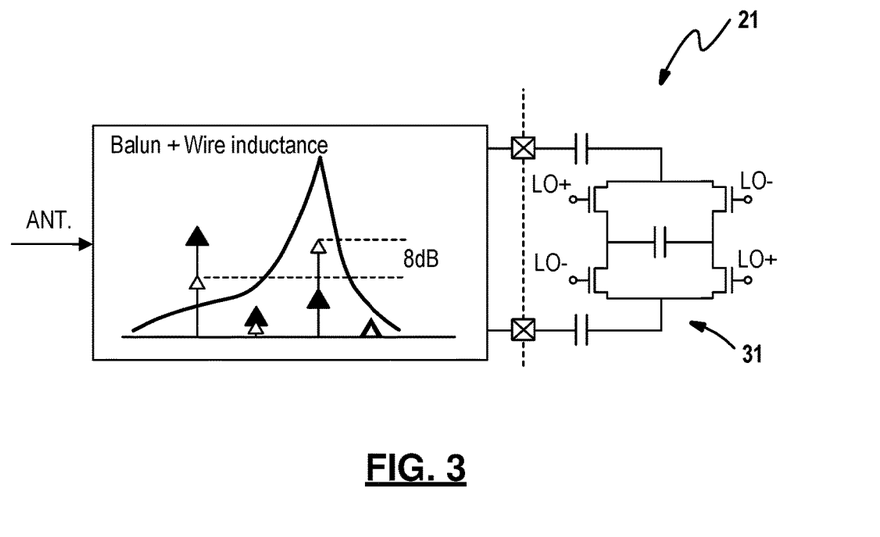
FIG. 3 is a schematic of an example front-end circuit implementation.

FIG. 3 further illustrates an example implementation for the front-end circuit 21. An off-chip balun 26 is interposed between the antenna 25 and the analog front-end circuit 21. The front-end circuit 21 is comprised of a mixer 31 and in particular a double-balanced passive mixer. The input impedance is capacitive, thus the series inductor provides some voltage boost, so long as the Q value of the off-chip inductance is larger than 25. A resonant LC tank on the RF front-end 21 not only provides voltage gain, but also filters out other harmonic components. The boosted RF signal is fed into the dual balanced RF mixer 31 whose gate potential is biased to maximize the conversion gain of the passive mixer. According to measurements, mixing with the $3^{rd}$ harmonic term of the LO provides 10 dB less conversion gain compared to the fundamental mixing term.

Figure 4A:
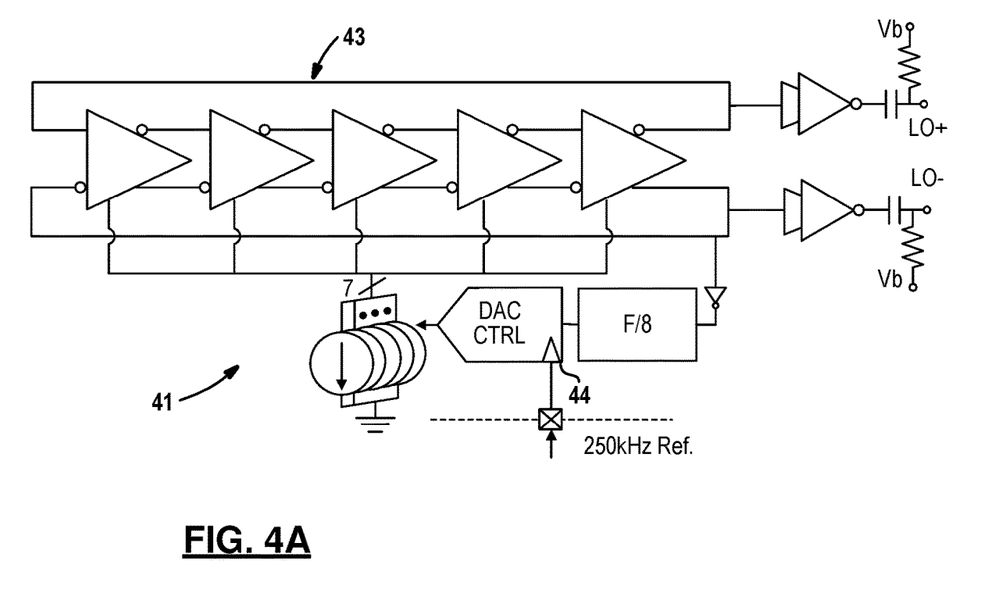
FIG. 4A is a diagram for an example clock circuit.
Figure 4B:
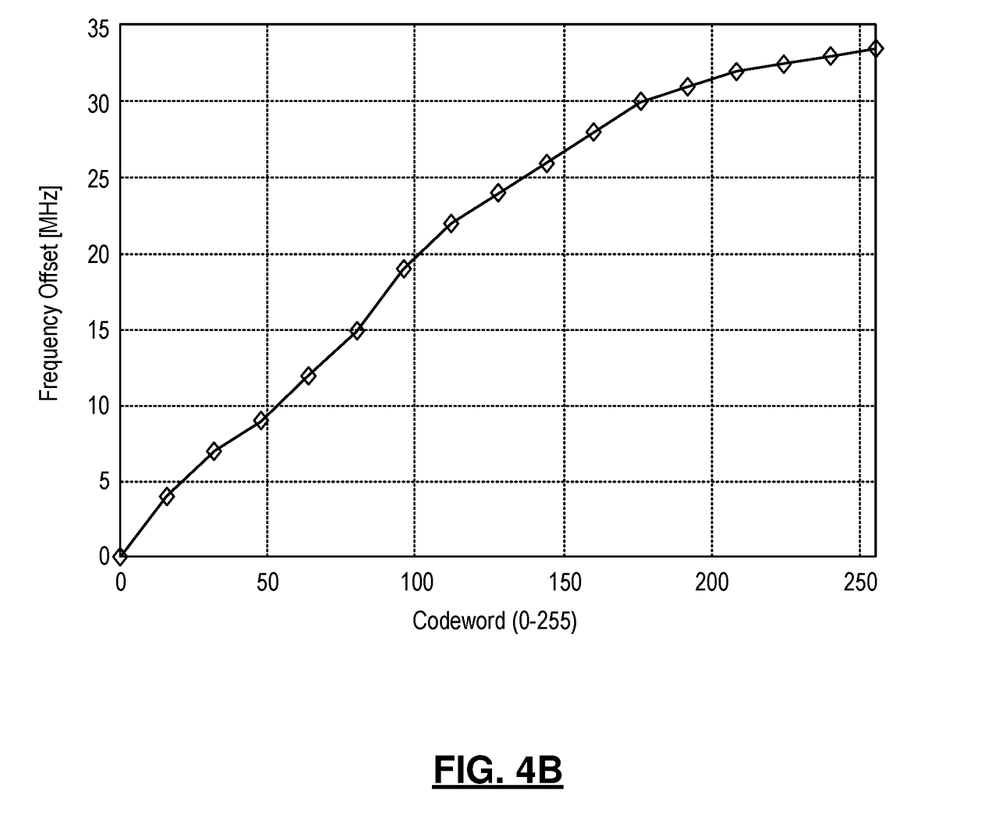
FIG. 4B is a graph showing a frequency change of the fundamental local oscillator at different codewords.

FIG. 4A illustrates an example implementation for the clock circuit 24. In this example, the clock circuit 24 is a frequency-locked loop circuit 41. The frequency-locked loop circuit 41 is composed of a current controlled 5-stage differential ring oscillator 43 with a counter based digital controller 44. In operation, the digital controller 44 counts the divided frequency over reference clock cycle periods, and compares this to the target. The loop filter then has two modes: 1) if the counter value is less than a threshold, it increments or decrements the binary control word of the current DAC by one, approaching the final frequency with a slew rate; 2) if the counter value is above the threshold, meaning the DCO frequency is far from the target, the FLL enters a higher-gain mode and slews at a faster rate towards the target. FIG. 4B shows the LO frequency range, which is applied directly to the mixer which then mixes down the $3^{rd}$ harmonic term. The effective LO tuning resolution in the 5.8 GHz band is 0.5 MHz, sufficient for tuning to the center of a 20 MHz Wi-Fi channel for demodulating back-channel FSK. The threshold of the digital controller 44 and the number of cycles is programmable. The $2^{nd}$ LOS that drive the mixers in the intermediate frequency stage circuit 22 are composed of I & Q square waves at 20 MHz and 10 MHz for the high and low bands. Those are generated from the same FLL driving the RF mixer in the front-end circuit 21.

With continued reference to FIG. 2, the intermediate frequency stage circuit 22 is configured to receive the down converted signal from the analog front-end circuit. The intermediate frequency stage circuit 22 routes the down converted signal into each of two circuit detection paths: a first circuit detection path and a second circuit detection path. Each circuit detection path further down converts the down converted signal into a baseband signal and thereby forms a pair of baseband signals. For example, the first circuit detection path may include a first mixer that mixes the down converted signal with a first mixing signal to yield a first mixed signal. The first mixing signal has a frequency substantially equal to a mark frequency of the binary frequency-shift keying method used to encode the RF input signal. Similarly, the second circuit detection path may include a second mixer that mixes the down converted signal with a second mixing signal to yield a second mixed signal. In this case, the second mixing signal has a frequency substantially equal to a space frequency of the binary frequency-shift keying method used to encode the RF input signal. In this way, the pair of baseband signals are shifted so that one of the two signals has a frequency at or near zero.

In the example embodiment, quadrature down conversion is applied to the incoming signal from the front-end circuit 21. In this case, a pair of mixers is employed in each circuit detection path; one mixer is for the in-phase signal component and one mixer is for the quadrature component. The intermediate frequency stage circuit 22 further includes one or more amplifiers. In this embodiment, a low noise amplifier 12 and a variable gain amplifier 13 are interposed between the analog front-end circuit 21 and the two circuit detection paths. Other types of amplifiers as well as different arrangements for these amplifiers are also contemplated by this disclosure.

Figure 5:
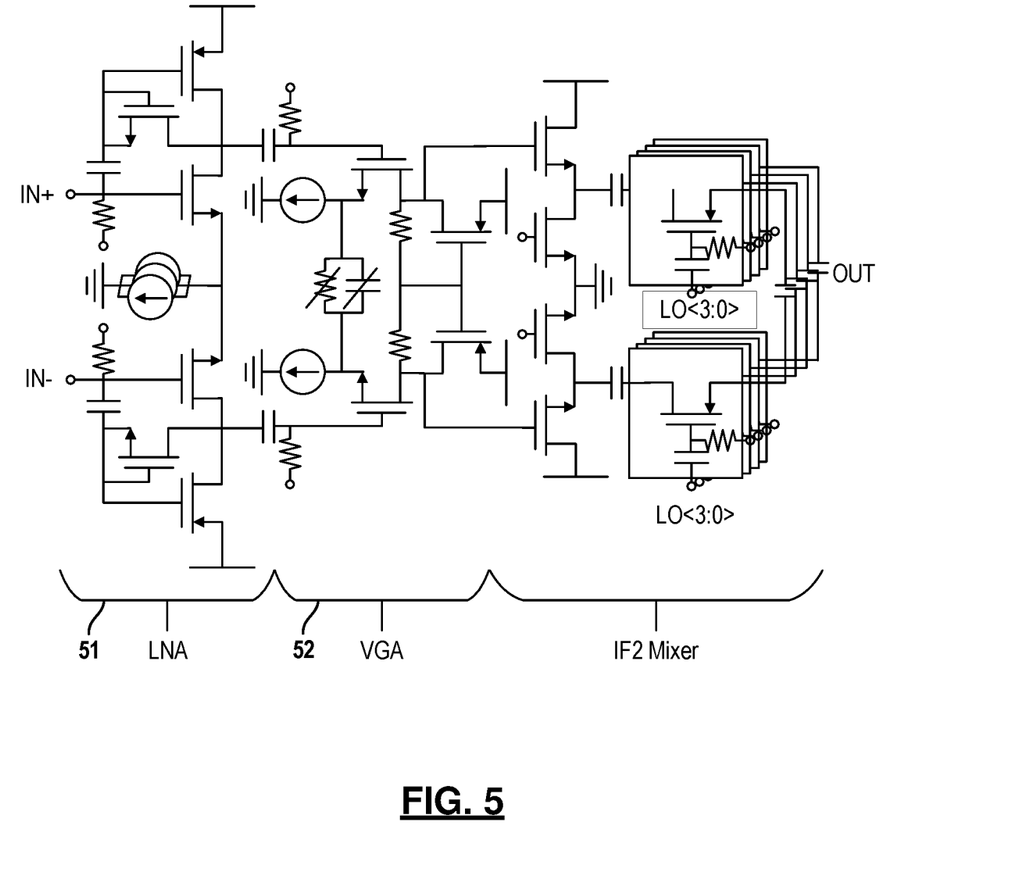
FIG. 5 is a schematic of an example intermediate frequency circuit.

FIG. 5 further illustrates an example implementation for the intermediate frequency stage circuit 22. In this example, a low-noise amplifier (LNA) 51 and a variable gain amplifier (VGA) 52 together provide the gain in the signal path. An inverter-based self-biased common source amplifier is chosen for the low-noise amplifier 51 due to its high input impedance, and good gain efficiency. On the other hand, the variable gain amplifier 52 is a differential common-source amplifier that has gain tuning RC network between is source degenerated current sources in the amplifier. The LNA and VGA are self-biased through a replica circuit. These circuits also perform the band-pass filtering of the down converted signal from 5 MHz to 25 MHz. The differential output signals of the VGA are buffered, and then mixed down by IF2 Mixer, which does quadrature mixing the IF signal to baseband. The second mixer shifts target IF frequency (5-25 MHz) by 10 MHz (low bit decision path), or 20 MHz (high bit decision path).

Returning to FIG. 2, the baseband frequency stage circuit 23 is configured to receive the pair of baseband signals from the intermediate frequency stage circuit 22. The baseband frequency stage circuit 23 operates to demodulate bits encoded on the baseband signals. In each circuit detection path, a low pass filter 2 is followed by an envelope detector 4 and an integrator 6. Output from each integrator 6 in turn serves as an input to a comparator circuit 8. The comparator circuit 8 compares magnitude of signal energy from the first circuit detection path to magnitude of signal energy in the second circuit detection path and outputs a bit decision in accordance with the comparison. In this way, bits encoded on the RF input signal are demodulated.

More specifically, the baseband frequency state circuit 23 collects the energy of each sideband of the OFDM symbol and compares these to demodulate the FSK back-channel signal. Signal energy is measured from the baseband stage by using quadrature down-conversion, squaring, and integration. This approach is chosen, rather than measuring the power at IF1, because of the mismatch, and increased power consumption of implementing two separate band-pass filters for each sideband. The 5 MHz-25 MHz filtered IF signal is down-converted by quadrature mixers which are driven by two local oscillators. Each local oscillator is centered on each sideband. The low pass filters filter out the undesired band so that it captures only the in-band spectrum.

Figure 6A:
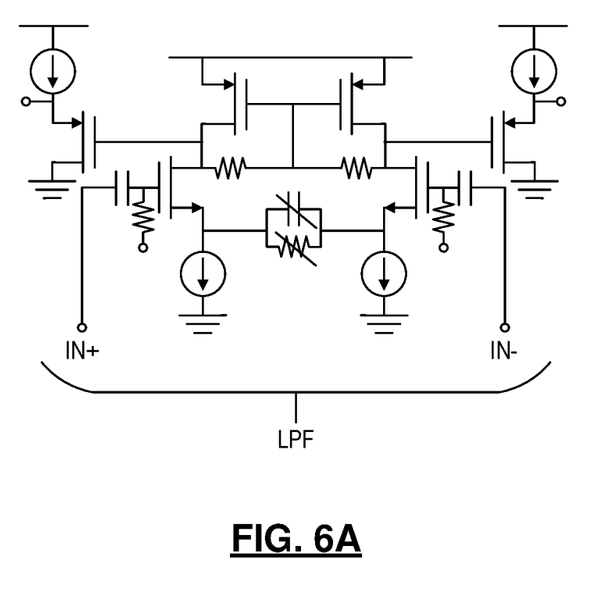
FIG. 6A is a schematic of an example low-pass filter suitable for the low power RF receiver.
Figure 6B:
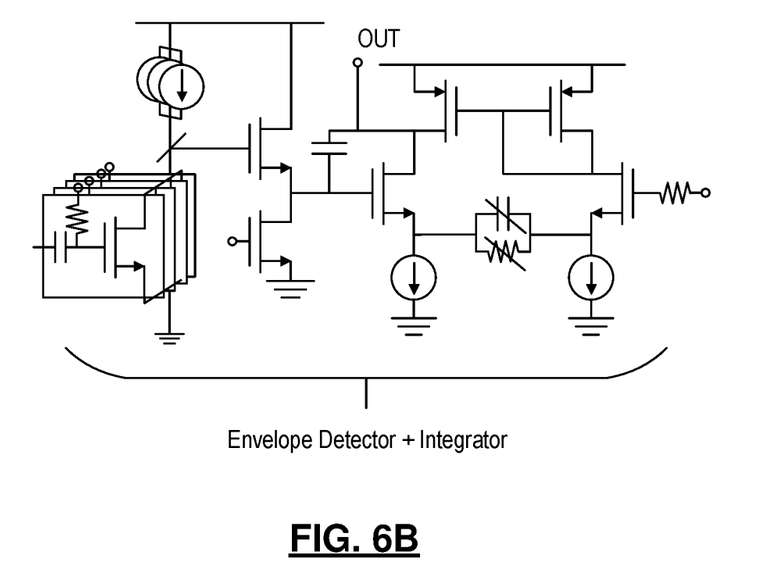
FIG. 6B is a schematic of an example envelope detector and integration circuit suitable for the low power RF receiver

In one embodiment, the topology of the low pass filters is as same as the VGA, which use conventional source degenerated differential amplifiers, with the voltage gain controlled by source degenerated FETs for robust gain control and tuning range as seen in FIG. 6A. The topology for the envelop detector and the integrator is shown in FIG. 6B. The squaring block is an envelope detector, which drives the gate on the border of the linear and saturation regions. The 7-bit PMOS current DAC is used to calibrate any DC offset between the high and low squaring blocks in order to remove any bias in the final bit decision. The squared output signal is then integrated by the integrator that has bandwidth of 250 kHz, which is as same as the minimum time interval of the FSK back-channel symbol.

The goal was to design a receiver with minimized power consumption, while receiving a back-channel signal from an 802.11a Wi-Fi router at a range of ~30 m. Based on a link budget calculation, the required sensitivity of the receiver is ~68 dBm assuming a $1/d^3$ path loss, and a transmission power of the Wi-Fi router of 20 dBm. Three receiver employs a passive mixer-first architecture and a 2-step down-conversion which help to reduce power, at the expense of increased noise factor. Also, the receiver down-converts the RF signal with an LO at ⅓ the RF frequency for power efficiency. The main power saving features of the design are 1) back-channel messages modulate information onto wideband FSK symbols transmitted by a standard Wi-Fi radio, which are detectable by ULP receivers; 2) the RF mixer down-converts 5.8 GHz as the $3^{rd}$ harmonic term from a commutating mixer switching at 1.9 GHz. Because all LO paths switch at 1.9 GHz, this significantly reduces power of the oscillator, LO buffers, and divider in the FLL, which are often the highest power blocks in an ULP radio; 3) low-noise amplification, filtering and variable gain amplification is performed at the first intermediate frequency (IF1); and (4) the IF1 signal is further down-converted by $2^{nd}$ quadrature mixers (IF2 Mixer), whose LO is driven from the FLL, which separates the upper and lower halves of the back-channel FSK into two wideband energy-detection paths. The baseband circuits filter each half of the Wi-Fi channel, envelop detect and integrate them to measure and compare the energy in the low and high halves to make a bit decision.

Figure 7:
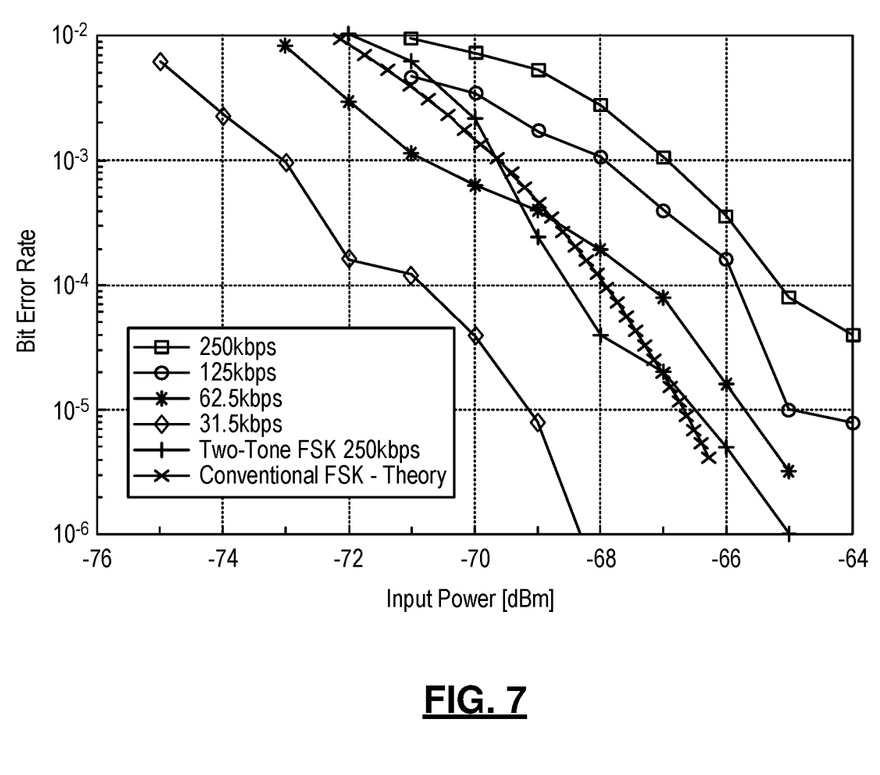
FIG. 7 is a graph showing the bit error rate waterfall curve for the low power RF receiver.
Figure 8:
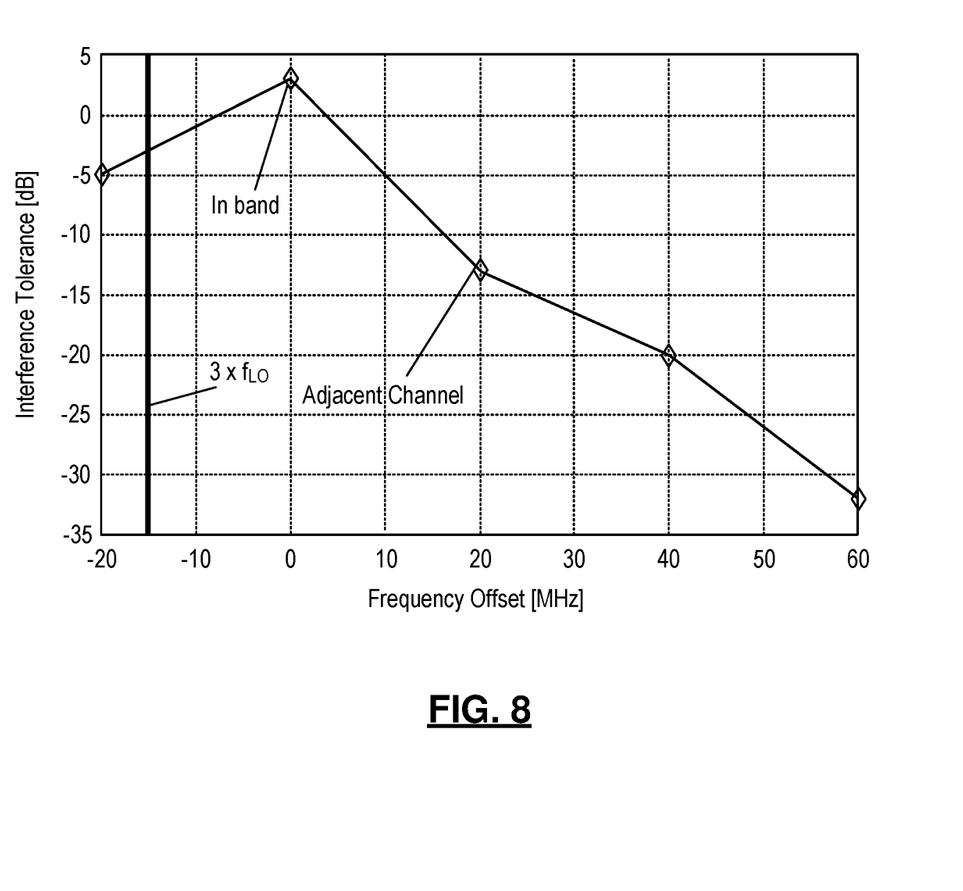
FIG. 8 is a graph showing the signal to interference ratio for the proposed low power RF receiver.

For demonstration purposes, the receiver was fabricated in a CMOS LP-65 nm technology. The active area is 0.228 $mm^2$. FIG. 7 shows the BER performance versus input power at different back-channel data rates. The data-rate of the Wi-Fi back channel FSK can be adjusted by combining multiple OFDM symbols into one super symbol. For example, the sequence '1 0 0 1' with a data-rate of 125 kb/s is generated by sending the Wi-Fi back-channel signal '11 00 00 11'. The measured sensitivity at BER=$10^{-3}$ is −67 dBm when the data-rate is 250 kb/s, and −72 dBm when the data-rate is 31.25 kb/s. Conventional two-tone FSK was also tested, which results in 1.5 dB better performance than wideband FSK, because of the non-uniform gain response across each sideband. The center of the sidebands provides the highest gain, hence, the total gain provided for multiple-carrier wideband signals is effectively less than with single tones. FIG. 8 shows the signal to interference rejection ratio of the receiver. As can be seen, the SIR is 13 dB for the adjacent higher channel, and 5 dB for the adjacent lower channel because of imperfect image rejection. The LC resonant matching network on the RF front-end improves the voltage gain by 4 dB. The matching network attenuates the fundamental component, which eventually results in a gain difference between the fundamental (un-desired) and $3^{rd}$ harmonic (desired) component by 8 dB. The overall gain of the receiver is 60 dB at the output of the envelope detectors.

Figure 9:
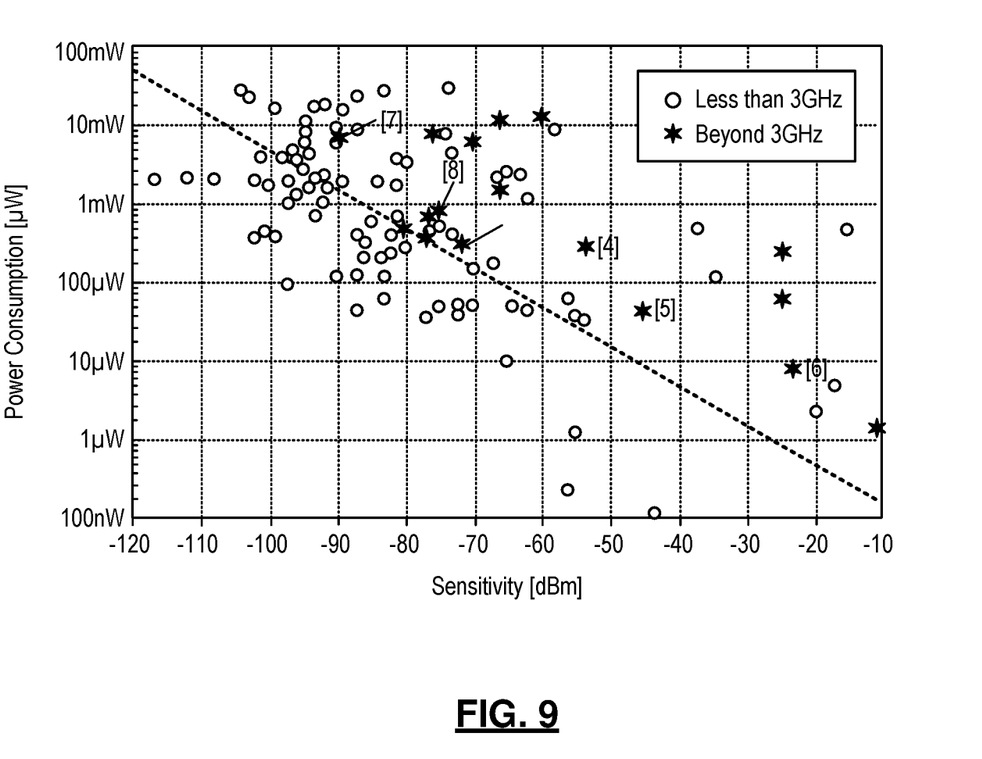
FIG. 9 is a graph showing a radio survey from 2005 to present, where data is collected from ISSCC, JSSC, VSLI, RFIC, CICC.

A comparison between state-of-art narrow band ULP radios operating in the 5.8 GHz band is shown in Table I. FIG. 9 shows sensitivity vs. power for state-of-art low power radios. This back-channel receiver is close to the Pareto-optimal line for all ULP radios operating above 3 GHz, and the only one that is compliant with any IEEE standard.

TABLE I

COMPARISON WITH STATE-OF-ART ULP NARROW BAND RADIOS

|  | JSSC[4] | ISSCC[5] | ISSCC[6] | VLSI[7] | RFIC[8] | This work |
|---|---|---|---|---|---|---|
| Process Node | CMOS 65 nm | CMOS 130 nm | CMOS 65 nm | CMOS 130 nm | CMOS 65 nm | CMOS 65 nm |
| Supply Voltage | 1.2 V | 3-3.6 V | 0.6 V | 1.5 V | 0.5 V | 1 V, 0.85 V |
| Operating Frequency | 5.6 GHz | 5.8 GHz | 5.8 GHz | 5 GHz | 5.85 GHz | 5.8 GHz |
| Modulation | PPM | OOK | OOK | OOK | OOK | FSK |
| Architecture | Direct down-conversion | RF-rectification | RF-rectification | Super-regeneration | Direct down-conversion | Two-step down-conversion |
| Data-rate | 1 Mb/s | 14 kb/s | 100 kb/s | 1.2 Mb/s | 300 kb/s | 250 kb/s   31.25 kb/s |
| Active power | 290 µW | 15 µW | 8.2 µW | 6.6 µW | 830 µW | 335 µW |
| Sensitivity* | −53.5 dBm | −45 dBm | −23 dBm | −90 dBm | −75 dBm | −67 dBm   −72 dBm |
| SIR** | −12 dB | NA | NA | −30 dB | NA | −13 dB |

*BER@ $10^{-3}$
**Adjacent Channel

An ULP FSK back-channel receiver in LP-65 nm CMOS was presented. By utilizing binary FSK back-channel embedded in IEEE 802.11a packets, this receiver achieves ULP operation and compatibility with Wi-Fi standards. Down-conversion with the $3^{rd}$ harmonic term of the LO reduces the power consumption in the LO block significantly, at the expense of noise performance. The receiver consumes 335 µW active power with a sensitivity of −72 dBm at BER of $10^{-3}$.

TABLE II

WI-FI BACK-CHANNEL RECEIVER POWER BREAK-DOWN

|  | FLL + RVCO | LO Buffer | IF-LO gen | IF stage | BB stage | Bias |
|---|---|---|---|---|---|---|
| Power Consumption | 128 µW | 57 µW | 33 µW | 68 µW | 42 µW | 17 µW |

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

What is claimed is:
1. A low power RF receiver, comprising:
an analog front-end circuit configured to receive an RF input signal and mixes the RF input signal with a front-end mixing signal to yield a down converted signal while simultaneously suppressing signals at a frequency of the front-end mixing signal, where the front-end mixing signal has a frequency set at third harmonics of a difference between frequency of the RF input signal and a target frequency for the down converted signal;

an intermediate frequency stage circuit configured to receive the down converted signal from the analog front-end circuit and routes the down converted signal into each of two circuit detection paths, where each circuit detection path further down converts the down converted signal into a baseband signal and thereby forms a pair of baseband signals; and a baseband frequency stage circuit configured to receive the pair of baseband signals from the intermediate frequency stage circuit and demodulate bits encoded on the baseband signals, where the bits are encoded on the baseband signals using frequency-shift keying.

2. The low power RF receiver of claim 1 further comprises an antenna configured to receive the RF input signal and a balun interposed between the antenna and the analog front-end circuit.

3. The low power RF receiver of claim 1 wherein the analog front-end circuit includes a passive mixer in series with at least one amplifier.

4. The low power RF receiver of claim 1 wherein the two circuit detection paths are formed by a first circuit detection path and a second circuit detection path, the first circuit detection path having a first mixer in series with a first low pass filter, wherein first mixer mixes the down converted signal with a first mixing signal to yield a first mixed signal, the first mixing signal having a frequency equal to a mark frequency of the binary frequency-shift keying method;

the second circuit detection path having a second mixer in series with a second low pass filter, wherein second mixer mixes the down converted signal with a second mixing signal to yield a second mixed signal, the second mixing signal has a frequency equal to a space frequency of the binary frequency-shift keying method.

5. The low power RF receiver of claim 4 wherein cutoff of the first low pass filter and cutoff of the second low pass filter are set in between zero and the space frequency of the binary frequency-shift keying method.

6. The low power RF receiver of claim 5 wherein the baseband frequency stage circuit includes an envelope detector circuit, an integrator circuit and a comparator circuit.

7. The low power RF receiver of claim 6 wherein the comparator circuit compares magnitude of signal energy in the first circuit detection path to magnitude of signal energy in the second circuit detection path and outputs a bit decision in accordance with the comparison.

8. The low power RF receiver of claim 4 further comprises a frequency-locked loop circuit interfaced with the analog front-end circuit and an intermediate frequency stage circuit, wherein the frequency-locked loop circuit generates the front-end mixing signal, the first mixing signal and the second mixing signal.

9. The low power RF receiver of claim 1 wherein the analog front-end circuit, the intermediate frequency stage circuit, and the baseband frequency stage circuit form an integrated circuit.

10. A low power RF receiver, comprising:

an analog front-end circuit configured to receive an RF input signal and operates to down convert the RF input signal to a down converted signal, where the RF input signal is encoded with a binary frequency-shift keying method; and an intermediate frequency stage circuit configured to receive the down converted signal from the analog front-end circuit and route the down converted signal into two circuit detection paths, each circuit detection path further down converts the down converted signal into a baseband signal and thereby forms a pair of baseband signals;

a first circuit detection path having a first mixer in series with a first low pass filter, wherein first mixer mixes the down converted signal with a first mixing signal to yield a first mixed signal, the first mixing signal having a frequency equal to a mark frequency of the binary frequency-shift keying method;

a second circuit detection path having a second mixer in series with a second low pass filter, wherein second mixer mixes the down converted signal with a second mixing signal to yield a second mixed signal, the second mixing signal has a frequency equal to a space frequency of the binary frequency-shift keying method; wherein cutoff of the first low pass filter and cutoff of the second low pass filter are set in between zero and the space frequency of the binary frequency-shift keying method.

11. The low power RF receiver of claim 10 wherein the analog front-end circuit mixes the RF input signal with a front-end mixing signal, such that the front-end mixing signal has a frequency set at third harmonic of a difference between frequency of the RF input signal and a target frequency of a down converted signal.

12. The low power RF receiver of claim 10 further comprises an antenna configured to receive the RF input signal and a balun interposed between the antenna and the analog front-end circuit.

13. The low power RF receiver of claim 10 wherein the cutoff of the first low pass filter is same as the cutoff of the second low pass filter.

14. The low power RF receiver of claim 10 further comprises a baseband frequency stage circuit configured to receive the pair of baseband signals from the intermediate frequency stage circuit and demodulate bits encoded on the baseband signals, where the bits are encoded on the baseband signals using frequency-shift keying.

15. The low power RF receiver of claim 14 wherein the baseband frequency stage circuit includes an envelope detector circuit, an integrator circuit and a comparator circuit.

16. The low power RF receiver of claim 15 wherein the comparator circuit compares magnitude of signal energy in the first circuit detection path to magnitude of signal energy in the second circuit detection path and outputs a bit decision in accordance with the comparison.

17. The low power RF receiver of claim 16 further comprises a frequency-locked loop circuit interfaced with the analog front-end circuit and an intermediate frequency stage circuit, wherein the frequency-locked loop circuit generates the front-end mixing signal, the first mixing signal and the second mixing signal.

18. The low power RF receiver of claim 10 wherein the analog front-end circuit, the intermediate frequency stage circuit, and the baseband frequency stage circuit form an integrated circuit.

* * * * *